United States Patent [19]

Higham et al.

[11] Patent Number: 4,761,960
[45] Date of Patent: Aug. 9, 1988

[54] CRYOGENIC REFRIGERATION SYSTEM HAVING AN INVOLUTE LAMINATED STATOR FOR ITS LINEAR DRIVE MOTOR

[75] Inventors: Graham J. Higham, Ashland, Mass.; Howard D. Snively, Schenectady, N.Y.; Harry G. Nicoll, Norwell; Gerald R. Pruitt, Mendon, both of Mass.

[73] Assignee: Helix Technology Corporation, Waltham, Mass.

[21] Appl. No.: 885,218

[22] Filed: Jul. 14, 1986

[51] Int. Cl.[4] .............................. F25B 9/00
[52] U.S. Cl. .......................... 62/6; 310/12; 310/15; 60/520
[58] Field of Search ............... 62/6; 60/520; 310/13, 310/14, 23, 216, 12, 15, 24

[56] References Cited

U.S. PATENT DOCUMENTS

| | | |
|---|---|---|
| 3,182,216 | 1/1961 | Bancroft . |
| 3,891,874 | 6/1975 | Roters et al. . |
| 3,937,600 | 2/1976 | White . |
| 4,210,831 | 7/1980 | Hurst . |
| 4,545,209 | 10/1985 | Young .................................. 62/6 |

Primary Examiner—Henry A. Bennett
Attorney, Agent, or Firm—Hamilton, Brook, Smith & Reynolds

[57] ABSTRACT

In a cryogenic split Stirling refrigerator, the compressor is driven by linear drive motors. Each linear drive motor has an armature hermetically sealed by a housing 20. Surrounding the housing is a stator formed from two bodies each housing a drive coil 48 and 49. Each body consists of two components 52-55 formed from involute laminations which have been aligned after the coil has been inserted. Separating the bodies is a magnet 56.

23 Claims, 6 Drawing Sheets

CRYOGENIC REFRIGERATION SYSTEM HAVING AN INVOLUTE LAMINATED STATOR FOR ITS LINEAR DRIVE MOTOR

FIELD OF THE INVENTION

This invention relates to a linear electrodynamic motor used in a cryogenic refrigeration system such as a split Stirling cryogenic refrigerator. In particular, it relates to such a system having a displacer and/or compressor driven by a linear motor having an involuted laminated stator.

BACKGROUND

Figure 1:
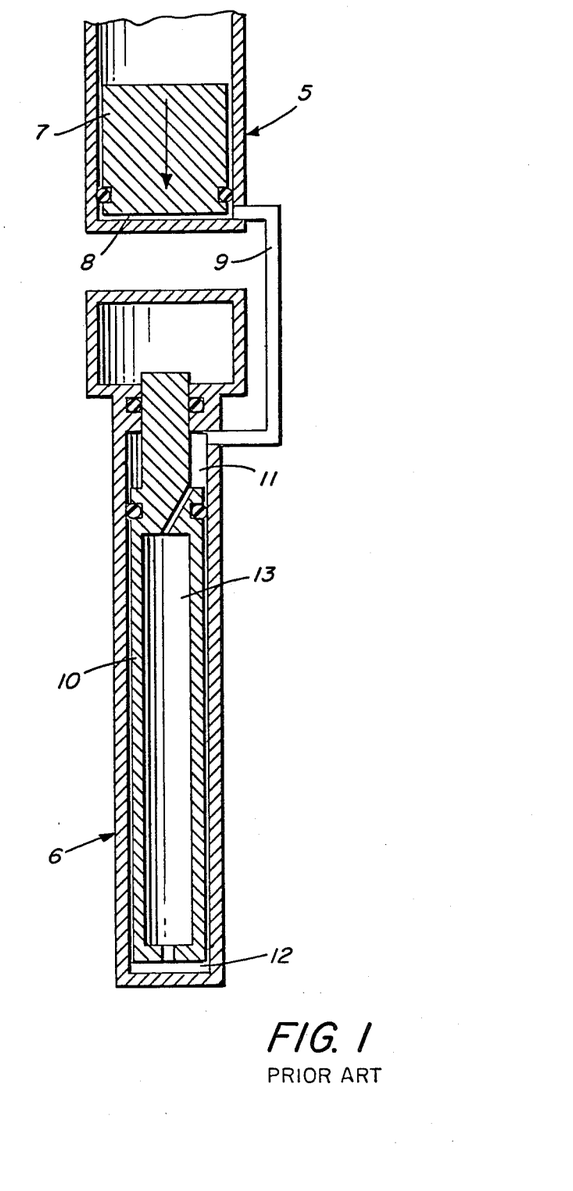
FIG. 1 illustrates the operation of a conventional pneumatically driven split Stirling refrigerator.

A conventional split Stirling refrigeration system is shown in FIG. 1. This system includes a reciprocating compressor 5 and a cold finger 6. The piston 7 of the compressor provides a near sinusoidal pressure variation in a pressurized refrigeration gas such as helium. This pressure variation is transmitted from the head space 8 to the cold finger 6 through a supply line 9.

The usual split Stirling system includes an electric motor driven compressor. A modification of that system is the split Vuilleumier system. In that system, a thermal compressor is used. This invention is applicable to both of those refrigerators as well as others such as Gifford-MacMahon refrigerators.

The cold finger 6 houses a cylindrical displacer 10. This displacer is free to move in a reciprocating motion. This motion is responsive to changes of volumes in a warm space 11 and a cold space 12. Contained within the displacer is a regenerative heat exchanger 13 comprised of several hundred fine mesh metal screen discs stacked to form a cylindrical matrix. Heat exchangers are also known to be comprised of stacked balls. This construction allows helium to flow through the regenerator between the warm space 11 and the cold space 12.

With the movement of the compressor piston 7, the pressure in the working volume 8, 9, 11, 12, 13 begins to rise from a minimum pressure to a maximum pressure. As a result, the temperature of the working volume of gas begins to rise. Heat created by the increase in pressure is then transferred to the environment; as a result, the compression at the warm end 11 of the cold finger is nearly isothermal. As the pressure increases, a pressure differential across the displacer in the cold finger is created. When retarding forces are overcome, the displacer is free to move within the cold finger. Along with the movement of the displacer, this pressure differential forces the working gas from the warm end of the cold finger through the regenerator and into the cold space 12. As the pressurized refrigerant gas flows through the regenerator, heat is absorbed. Thus, the temperature of the gas is cooled.

When the compressor piston reverses its direction and begins to expand the volume of gas in the working volume, the helium in the cold space is cooled even further. It is this cooling at the cold end of the displacer which provides refrigeration for maintaining a time average temperature gradient of over 200 degrees Kelvin over the length of the regenerator.

As the gas in the working volume is expanded, a pressure differential is created from the cold space to the warm space. When retarding forces are overcome, the displacer is free to move towards the warm space. This pressure differential also forces the working gas from the cold space through the regenerator and into the warm space 11. Heat is absorbed from the regenerator by the gas as it passes through to the warm end of the cold finger. As a result, the displacer is returned to its starting position.

More recently, refrigerators have been proposed and manufactured that depend on linear motor systems to control the movement of the piston or pistons in the compressor and that of the displacer. For example, in the patent application of Niels O. Young, Ser. No. 458,718, now U.S. Pat. No. 4,545,209, each compressor includes a permanent magnet mounted to the moving armature of the motor which, in turn, drives a piston element.

A goal in the use of these linear motor refrigerators is to produce a more efficient refrigerator which is both easier and less expensive to manufacture.

DISCLOSURE OF THE INVENTION

This invention relates to several improvements in the linear drive motor used in a cryogenic refrigerator. A primary improvement is that the motor includes a stator comprising a split body formed from involute laminations housing a coil therein. This stator surrounds a housing which hermetically seals the volume in which an armature reciprocates. When the coil is energized by an alternating current, the piston is driven. This structure allows for a compact assemblage of a densely wound coil.

In further improvements of the linear motor of the present design, the laminations are involuted so that a virtual solid component is produced. This solid component is achieved by stacking involute laminations of uniform thickness around a bore. This construction allows for more iron per diameter than noninvolute laminations. Once two components have been stacked, alignment of the two components is easily accomplished after the insertion of the drive coil. Constructing the body in this way allows the invention to be less sensitive to misalignment of the laminations thereby avoiding possible added magnetic circuit air gap losses. Thus, an uninterrupted flux path is possible at the interface of the two components.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 2:
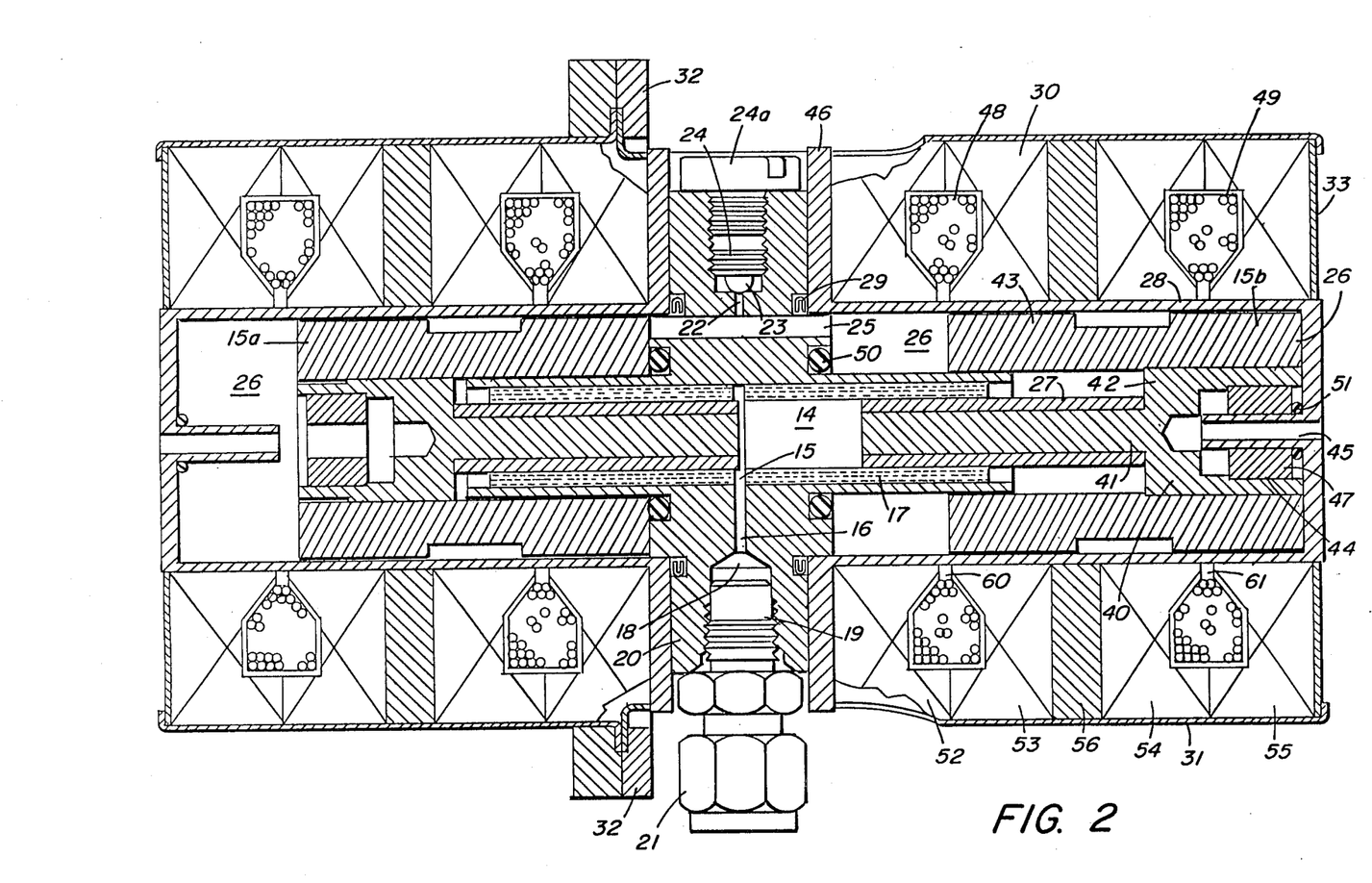
FIG. 2 is a longitudinal sectional view of a linear motor compressor embodying this invention.
Figure 3:
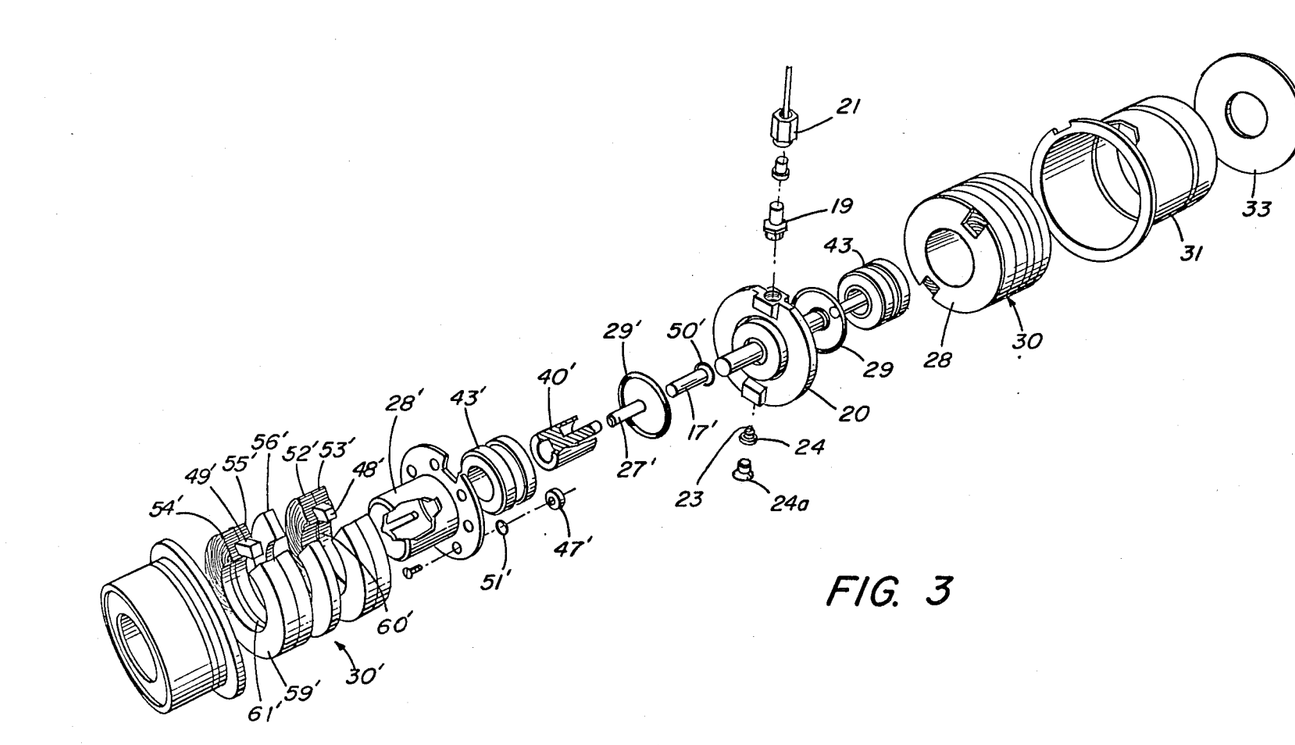
FIG. 3 is an exploded perspective view of the linear motor compressor of FIG. 2.

A preferred linear motor compressor is illustrated in FIG. 2. An exploded perspective view is shown in FIG. 3. This compressor comprises dual reciprocating piston elements 15a and 15b which when driven toward each other, compress helium gas in compressor head space 14. Note that FIG. 2 shows the two pistons 180° out of phase to show the two end positions of the piston; but, in operation the pistons would always be positioned in phase symmetrically relative to a center plane. The compressed gas passes through a side port 15 in a compression chamber cylinder 17 to a port 16 in the outer housing 20. The gas from the port 16 in the outer housing 20 passes into a clearance space 18 in that housing. Through the clearance space 18, the gas passes from the outer housing 20 to a tube fitting 19. A nut assembly 21 joined at the fitting 19 serves to deliver the gas to a cold finger of a split Stirling refrigerator in which a displacer is housed.

The outer housing 20 also provides for a ball and screw assembly 23 and 24. The ball and screw assembly permit easy charging of the compressor with helium gas through port 22 in the housing 20 to a chamber 25. From the chamber 25, the gas is allowed to communicate with the dead space 26 of each piston cylinder in a manner described below. During compressor operation, however, the ball 23 closes port 22 in the housing 20. The ball is secured against the port by the retainer screw 24. A protective dust cover screw 24A prevents dirt and debris from entering the ball and screw assembly 23 and 24.

Preferably, the piston elements, 15a and 15b, and the chamber cylinder 17 are close fitting to provide a clearance seal therebetween. It is preferred that the chamber cylinder 17 be made of ceramic. However, other hard, low friction materials such as cermet may be used. Note that although FIG. 2 shows the cooperation of two piston elements to compress gas, the right hand side of the compressor will be described below. A similar detailed description can be easily applied to the left hand side.

The piston element comprises a piston core 40 having a neck 41 and a body 42. Preferably the core 40 is made of a tungsten alloy to give more mass for resonant operation. A cermet sleeve 27 is joined to the perimeter of the neck 41. Joined to the perimeter of the body 42 is an iron mass 43. Iron is used because of its high magnetic permeability and high magnetic induction, however, other material having the same characteristics may be used. See U.S. Pat. No. 4,545,209 where a magnet is mounted to the armature. The body 42 also contains an inner annulus 44. Joined to the inner perimeter created by the annulus 44 is a ring magnet 47 which is part of a position sensor.

Surrounding the piston assembly just described is a pressure housing 28. The size of the pressure housing 28 is constructed to allow helium gas in the dead space 26 to flow freely between the pressure housing 28 and the iron mass 43 as the piston assembly shuttles back and forth. Preferably this housing is made of stainless, nonmagnetic material. At one end of this pressure housing, a tube-like depression 45 is formed to fit freely within the ring magnet's inner perimeter. This tube-like depression is used for inserting a Hall effect sensor (not shown) which determines piston position.

At the other end of the housing 28 there is an annular flange 46 which extends radially outward. Abutting the flange 46 and sealing the pressure housing 28 is the outer housing 20. A tight seal is accomplished by placing a C-ring seal 29 between the outer housing 20 and the flange 46. By arranging a tight seal, the compressor can be charged with helium gas through port 22 as mentioned above.

Located around the perimeter of the pressure housing 28 is a stator 30. Two drive coils 48 and 49 are situated within this stator and are used to drive the piston assembly. To prevent the piston assembly from over stroking and causing possible damage, two O-rings 50 and 51 are positioned on each side of the piston assembly. The stator assembly will be discussed in greater detail below.

In order to secure the stator and pressure housing in place a cover 31 is located at the perimeter of the stator 30. On one end of the cover 31 a washer 33 is positioned between the cover and the pressure housing so as to wedge the stator 30 against the pressure housing's flange 46. At the other end of the cover 31 an annular flange 32 extends outward. This flange is used to secure the right hand side of the compressor with the left.

In FIG. 3, a cutaway view of the preferred stator assembly 30' can be seen. As shown, a cylindrical body 59' is formed by two components 54' and 55' housing a drive coil 49'. Each component consists of stacked laminates subtending from a center axis hereafter known as involute laminations. The laminated construction is preferred over a solid structure because it decreases eddy current losses which can be significant in a solid structure. Contiguous with the inner radius of the body is a tooth gap 60'. Similarly, a second cylindrical body can be formed by assembling the drive coil 48' between another two involute laminated components 53' and 54' having a tooth gap 61'. A piece of nonmagnetic material may be inserted in the tooth gap in order to eliminate the gap, but generally this is not done. It is preferred that the laminations of the two components are aligned and tightly fitted together so that there is no space therebetween thereby achieving the highest stacking factor. Between the two bodies shown is an axially polarized magnet 56'. This donut magnet is used to provide magnetic flux for actuation of the linear motor.

When the coils 48' and 49' are energized from a suitable source of alternating current, opposite alternating flux currents form around the bodies. These alternating currents operate to shift the relative strength of flux between the armature and stator from one side of each tooth gap of the stator to the other. The differential flux densities across the tooth gap drive the piston assembly.

The advantage of assembling the stator in this way is that the drive coils 48' and 49' can be implanted with ease between the laminations 52'–55' during production. The conventional method of manufacturing stators by inserting a coil within a laminated housing by winding wire through the tooth gap has been eliminated. Elimination of the need for winding through the tooth gap also permits the highest copper fill factor in the coil, a desirable feature. Thus, problems associated with manufacturing the small motors required in cryogenic refrigerators can be avoided.

Figures 4, 7, 8:
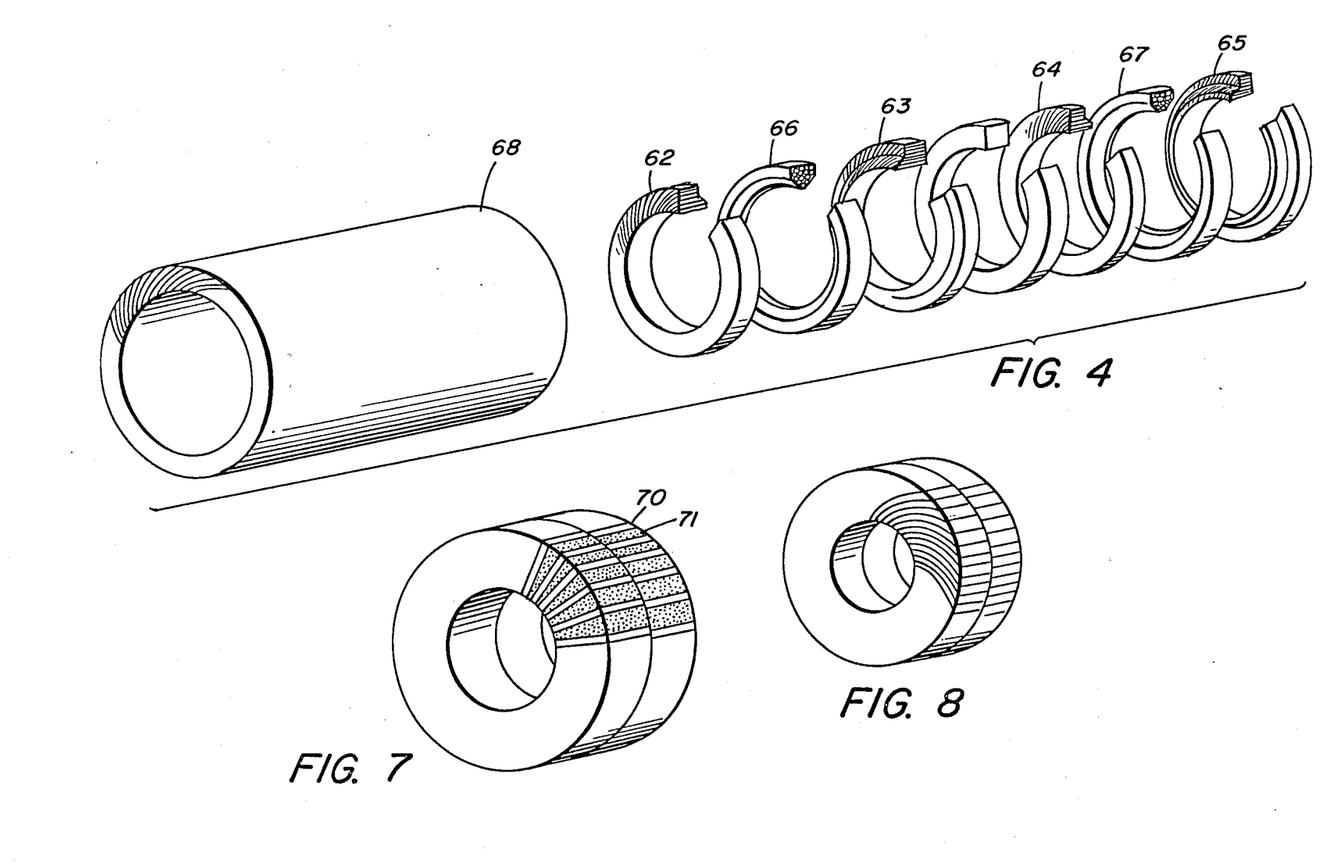
FIG. 4 is a perspective view of an alternative construction of the stator.
FIG. 7 is a perspective view of the outside perimeter of two misaligned components formed from noninvolute laminations.
FIG. 8 is a perspective view of the outside perimeter of two misaligned components formed from involute laminations.

In FIG. 4, another preferred embodiment showing the construction of a stator can be seen. FIG. 4 shows an inner cylinder constructed of laminated components 62-65 wedging drive coils 66 and 67 therebetween. Located around the perimeter of this cylinder is a laminated sleeve 68. This sleeve 68 is located around the cylinder in such a way that the laminations in the cylinder and the sleeve are in alignment and the space between the two is minimized. In this construction, the laminations in the sleeve are essentially a continuation of the laminations in the components 62-65.

Figure 5:
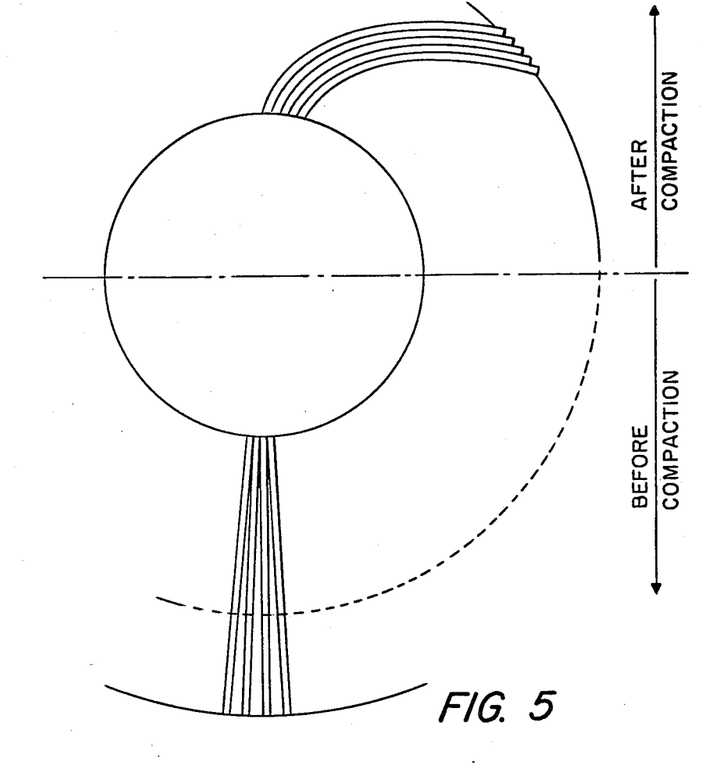
FIG. 5 is a partial end view of the stator of FIG. 3 before compaction and after compaction.

In FIG. 5, a partial end view of the stator before compaction and after compaction is shown. Here it can be seen that the laminated pieces are involute and are of uniform thickness. Each involute lamination (See FIG. 6) is constructed of a ferromagnetic material. Preferably, each laminated piece is made of high magnetic permeability and high magnetic saturation iron alloy, but other material such as cold-rolled steel or silicon steel may be used. The faces of the laminations may be coated with or treated by any of a number of means known in the art to provide a dielectric layer between laminations. As a result of compaction, the stator size has been significantly reduced.

Figure 6:
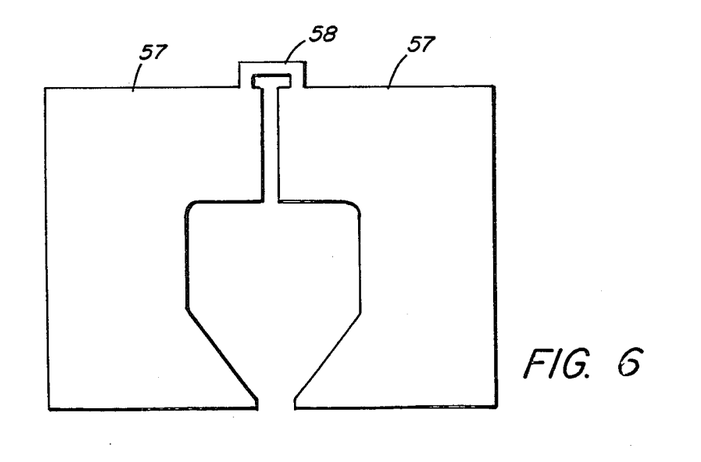
FIG. 6 is a perspective view of the fabrication of one lamination in the stator of FIG. 2.

In FIG. 6, one technique is shown for fabricating the laminations. However, other techniques employing stamping, die forming or similar methods may be used. In this figure two laminated pieces 57 are joined together by a bridge 58. This bridge is removed once the laminated piece has been formed.

Referring back to FIG. 5, the involute laminated pieces are stacked around a bore in such a way that there are no spaces between laminations. One of the advantages gained by involuting the laminations is that a higher stacking factor (more metal per diameter) is possible. Thus, an essentially solid ferromagnetic stator core free from unwanted voids in the high flux density region is constructed. This construction which forms a uniform, circumferential disposition of the laminations suppresses losses due to additional magnetic circuit gaps as a result of misalignment as explained below.

In FIG. 7, two components of the outside perimeter of the noninvolute laminated stator are shown to be misaligned. In this construction, laminations 70 of uniform thickness and length are stacked around a core and are separated by an insulating filler 71. As shown, the laminations are equally spaced from each other. Generally, however, this construction is rarely achieved in industry. Beside it, in FIG. 8, the outside perimeter of two misaligned components of the involute laminated stator are shown. As can be seen, each lamination stacks upon another lamination. Comparing these two figures, it can be seen that with a small misalignment, losses due to additional magnetic circuit gaps are minimized in the involute laminated construction. In the noninvolute structure, laminations may align on the insulating filler between the laminations because a 100% compaction is not possible; thus, substantial losses due to added gaps occur. Therefore, misalignment of the involute laminations is less critical to the operation of the motor. This concept can also be applied to the construction shown in FIG. 4.

Referring back to FIG. 3, it can be seen that an advantage gained by this invention is that easy alignment of the two laminated components is possible after housing the coil. Since both components have laminations which are stacked on a core to provide minimum spacing between each lamination, alignment can be made by simple inspection. For most efficient motors, it is preferred that the misalignment of the components be small as compared to the thickness of the laminations. A misalignment of 10% or less of the thickness of the laminations would accomplish this result. Therefore, any added gap losses that would be caused by any mismatch is minimized or eliminated.

Figure 9:
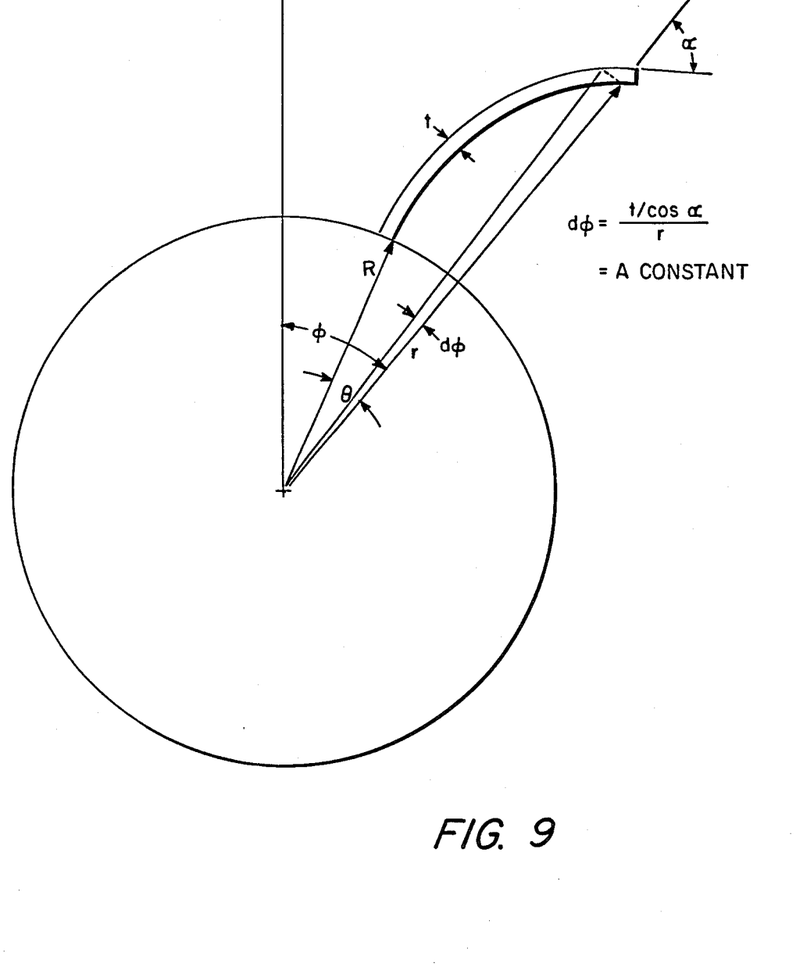
FIG. 9 is a view depicting key relationships of the involute form.

To achieve the maximum density of iron for the laminated components, a known formula can be used to determine the curve necessary for each lamination. The equation of the curve necessary to produce 100% compaction for laminations of uniform thickness stacked on a bore of radius R is:

$$\theta = \frac{\sqrt{r^2 - R^2}}{R} - \tan^{-1}\left[\frac{\sqrt{r^2 - R^2}}{R}\right] \text{radians;}$$

where r equals the outside radius and $\theta$ equals the change in angle of the lamination from the inner radius to the outer radius. The length of the curve from R to r is $L = (r^2 - R^2)/2R$. Another property of the involute is that for a lamination of thickness t, compaction is assumed when $r \cos \alpha / t = a$ constant; where $\alpha$ equals the angle between the radial vector, r, and the local tangent of the lamination. This is illustrated in FIG. 9.

In manufacturing these involute laminated components, providing 100% compaction is not always possible. Therefore, in order to realize acceptable motor performance it is preferred that space between the laminations are small as compared to the gap between the stator and the armature. For example, acceptable motor performance can be accomplished if the space between each lamination is at most 10% of the size of this gap. This is readily achievable by forming the exact involute or by approximating the involute with an arc of a circle matched to three points on the involute.

It has therefore been shown how the above involute laminated components improve the small electromagnetic linear oscillating motor. Particularly important is its application in cryogenic refrigeration systems. The involute laminated construction allows for a more compact motor thereby reducing the overall size and weight of the conventional system. By splitting the laminated stator into two components, easy insertion of the coil is now possible. Thus, a more densely wound coil can now be inserted.

While the invention has been particularly shown and described with reference to preferred embodiments thereof, it will be understood by those skilled in the art that various changes in form and details may be made without departing from the spirit and scope of the invention as defined in the appended claims.

We claim:

1. A cryogenic refrigerator comprising gaseous working fluid which is alternatively compressed and expanded to cool a portion of the working fluid to cryogenic temperatures and a linear oscillating drive motor for driving a piston element in the refrigerator which acts on the working fluid in a thermodynamic refrigeration cycle, the linear oscillating drive motor comprising a coil positioned within a laminated flux path, the flux path being formed of involute laminations split about the coil, said split cutting across the flux path.

2. A cryogenic refrigerator as claimed in claim 1, wherein the linear oscillating motor has a stator formed of involute laminations split about the coil.

3. A cryogenic refrigerator as claimed in claim 1, wherein the linear oscillating motor is used to compress gas in a compressor.

4. A cryogenic refrigerator as claimed in claim 3, wherein a stator of the linear oscillating motor of a compressor is formed of involute laminations split about the coil.

5. A cryogenic refrigerator as claimed in claim 1, wherein the split is a cross sectional cut.

6. A cryogenic refrigerator as claimed in claim 1, wherein the split is a circumferential cut.

7. A cryogenic refrigerator as claimed in claim 1, wherein an iron mass armature is fixed to the piston element.

8. A cryogenic refrigerator as claimed in claim 1, wherein the laminations have uniform thickness.

9. A cryogenic refrigerator as claimed in claim 1, wherein the laminations of the split body are aligned.

10. A cryogenic refrigerator as claimed in claim 9, wherein the alignment does not vary more than 10% of the thickness of the laminations.

11. A cryogenic refrigerator comprising gaseous working fluid which is alternatively compressed and expanded by a compressor to cool a portion of the working fluid to cryogenic temperatures and a linear oscillating drive motor for driving a piston element in the refrigerator which acts on the working fluid in a thermodynamic refrigeration cycle, the linear oscillating drive motor comprising a stator formed of involute laminations split about a coil, said split cutting across a flux path through the laminations.

12. A cryogenic refrigerator as claimed in claim 11, wherein the split is a cross sectional cut.

13. A cryogenic refrigerator as claimed in claim 11, wherein the split is a circumferential cut.

14. A cryogenic refrigerator as claimed in claim 11, wherein the laminations have uniform thickness.

15. A cryogenic refrigerator as claimed in claim 11, wherein the laminations of the split body are aligned.

16. A cryogenic refrigerator as claimed in claim 15, wherein the alignment does not vary more than 10% of the thickness of the laminations.

17. A linear oscillating motor comprising a coil positioned within a laminated flux path, the flux path being formed of involute laminations split about the coil, said split cutting across the flux path.

18. A linear oscillating motor as claimed in claim 17, wherein a stator comprises the body formed of involute laminations split about the coil housed therein.

19. A linear oscillating motor as claimed in claim 17, wherein the split is a cross sectional cut.

20. A linear oscillating motor as claimed in claim 17, wherein the split is a circumferential cut.

21. A linear oscillating motor as claimed in claim 17, wherein the laminations have uniform thickness.

22. A linear oscillating motor as claimed in claim 17, wherein the laminations of the split body are aligned.

23. A linear oscillating motor as claimed in claim 22, wherein the alignment does not vary more than 10% of the thickness of the lamination.

* * * * *